US008534709B2

(12) United States Patent
Hoffmuller et al.

(10) Patent No.: US 8,534,709 B2
(45) Date of Patent: Sep. 17, 2013

(54) SECURITY ELEMENT AND METHOD FOR PRODUCING THE SAME

(75) Inventors: Winfried Hoffmuller, Bad Tolz (DE); Marius Dichtl, Munich (DE); Andre Gregarek, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 354 days.

(21) Appl. No.: 12/865,461

(22) PCT Filed: Feb. 9, 2009

(86) PCT No.: PCT/EP2009/000882

§ 371 (c)(1),
(2), (4) Date: Jul. 30, 2010

(87) PCT Pub. No.: WO2009/100869

PCT Pub. Date: Aug. 20, 2009

(65) Prior Publication Data

US 2010/0320742 A1 Dec. 23, 2010

(30) Foreign Application Priority Data

Feb. 12, 2008 (DE) ......................... 10 2008 008 685

(51) Int. Cl.

| | |
|---|---|
| ***B42D 15/00*** | (2006.01) |
| ***B42D 15/10*** | (2006.01) |
| ***B29C 35/08*** | (2006.01) |
| ***H05B 6/00*** | (2006.01) |
| ***C03C 15/00*** | (2006.01) |
| ***C03C 25/68*** | (2006.01) |

(52) U.S. Cl.
USPC ................ 283/72; 264/400; 264/482; 216/94

(58) Field of Classification Search
USPC ........... 283/72; 216/94; 219/121.69, 121.68; 264/400, 482
See application file for complete search history.

(56) References Cited

U.S. PATENT DOCUMENTS 5,582,103 A 12/1996 Tanaka et al.
5,714,213 A * 2/1998 Antes et al. ..................... 283/72

(Continued)

FOREIGN PATENT DOCUMENTS

DE 4041025 6/1992
DE 19739193 3/1999

(Continued)

OTHER PUBLICATIONS

International Search Report, International Application No. PCT/EP2009/000882, 4 pages, Aug. 20, 2009.

(Continued)

*Primary Examiner* — Kyle Grabowski
(74) *Attorney, Agent, or Firm* — Lathrop & Gage LLP

(57) ABSTRACT

The present invention relates to a method for manufacturing a security element (12) having a metalized microrelief pattern and a negative pattern in register therewith, in which P) a substrate (20) is provided with an embossing pattern having elevations (24) and depressions (26) that form first and second regions having different first and second height levels, wherein the desired microrelief pattern (28) is introduced into the first regions of the embossing pattern, and the second regions of the embossing pattern are developed in the form of the desired negative pattern, M) the embossing pattern with the first and second regions is contiguously metalized (30), and L) the metalized embossing pattern is impinged on with laser radiation, to selectively remove the metalization (30) in the second regions of the embossing pattern through the action of the laser radiation.

32 Claims, 3 Drawing Sheets

(56) References Cited

U.S. PATENT DOCUMENTS

Figure 1:
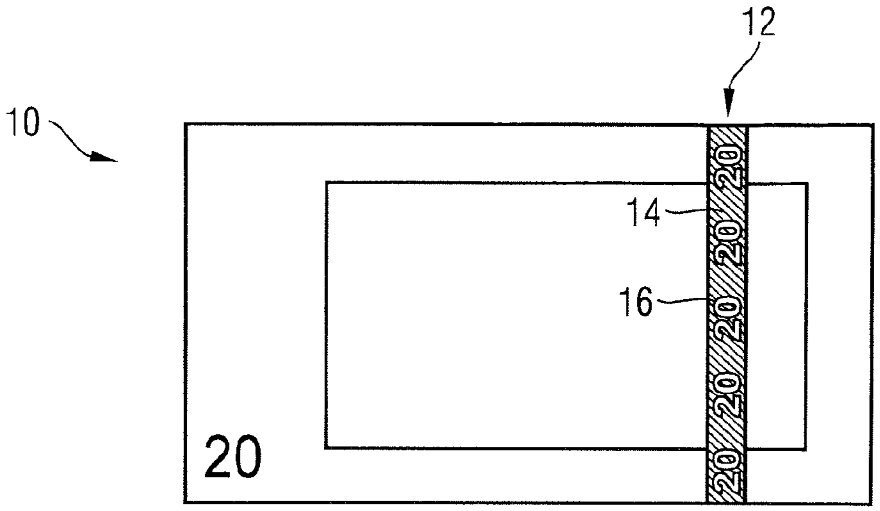

| | | | | |
|---|---|---|---|---|
| 6,082,778 | A * | 7/2000 | Solmsdorf | 283/85 |
| 6,602,578 | B1 * | 8/2003 | Tompkin et al. | 283/72 |
| 7,667,894 | B2 | 2/2010 | Hoffmuller | |
| 7,728,931 | B2 | 6/2010 | Hoffmuller | |
| 7,808,605 | B2 | 10/2010 | Hoffmuller | |
| 7,821,716 | B2 | 10/2010 | Staub et al. | |
| 7,986,459 | B2 | 7/2011 | Kaule | |
| 8,083,894 | B2 | 12/2011 | Gruszczynski | |
| 8,149,511 | B2 | 4/2012 | Kaule | |
| 2004/0239097 | A1 * | 12/2004 | Boehm et al. | 283/72 |
| 2006/0145468 | A1 * | 7/2006 | Plaschka et al. | 283/72 |
| 2007/0165182 | A1 | 7/2007 | Hoffmuller et al. | |
| 2007/0211238 | A1 | 9/2007 | Hoffmuller et al. | |
| 2007/0216518 | A1 | 9/2007 | Hoffmuller | |
| 2007/0229928 | A1 | 10/2007 | Hoffmuller et al. | |
| 2007/0241553 | A1 | 10/2007 | Heim et al. | |
| 2007/0246933 | A1 | 10/2007 | Heim et al. | |
| 2007/0274559 | A1 | 11/2007 | Depta et al. | |
| 2008/0014378 | A1 | 1/2008 | Hoffmuller et al. | |
| 2008/0050660 | A1 | 2/2008 | Staub et al. | |
| 2008/0054621 | A1 | 3/2008 | Burchard et al. | |
| 2008/0079257 | A1 | 4/2008 | Fessl | |
| 2008/0088859 | A1 | 4/2008 | Depta et al. | |
| 2008/0160226 | A1 | 7/2008 | Kaule et al. | |
| 2008/0163994 | A1 | 7/2008 | Hoppe et al. | |
| 2008/0198468 | A1 | 8/2008 | Kaule et al. | |
| 2008/0216976 | A1 | 9/2008 | Ruck et al. | |
| 2008/0250954 | A1 | 10/2008 | Depta et al. | |
| 2008/0258456 | A1 | 10/2008 | Rahm et al. | |
| 2009/0001709 | A1 | 1/2009 | Kretschmar et al. | |
| 2009/0008923 | A1 | 1/2009 | Kaule et al. | |
| 2009/0008926 | A1 | 1/2009 | Depta et al. | |
| 2009/0102605 | A1 | 4/2009 | Kaule | |
| 2009/0115185 | A1 | 5/2009 | Hoffmuller et al. | |
| 2009/0236061 | A1 | 9/2009 | Gruszczynski et al. | |
| 2009/0297805 | A1 | 12/2009 | Dichtl | |
| 2009/0322071 | A1 | 12/2009 | Dichtl | |
| 2010/0175843 | A1 | 7/2010 | Gregarek | |
| 2010/0177094 | A1 | 7/2010 | Kaule et al. | |
| 2010/0182221 | A1 | 7/2010 | Kaule et al. | |
| 2010/0194091 | A1 | 8/2010 | Heim et al. | |
| 2010/0194532 | A1 | 8/2010 | Kaule | |
| 2010/0196587 | A1 | 8/2010 | Keller | |
| 2010/0207376 | A1 | 8/2010 | Heim et al. | |
| 2010/0208036 | A1 | 8/2010 | Kaule | |
| 2010/0307705 | A1 | 12/2010 | Rahm et al. | |
| 2010/0308570 | A1 | 12/2010 | Heim | |
| 2010/0320742 | A1 | 12/2010 | Hoffmuller et al. | |
| 2011/0007374 | A1 | 1/2011 | Heim | |
| 2011/0012337 | A1 | 1/2011 | Heim | |
| 2011/0027538 | A1 | 2/2011 | Hoffmann et al. | |
| 2011/0045248 | A1 | 2/2011 | Hoffmuller et al. | |
| 2011/0069360 | A1 | 3/2011 | Dichtl et al. | |
| 2011/0079997 | A1 | 4/2011 | Heim | |
| 2011/0091665 | A1 | 4/2011 | Heim | |
| 2011/0095518 | A1 | 4/2011 | Hoffmuller et al. | |
| 2011/0101670 | A1 | 5/2011 | Heim | |
| 2011/0109078 | A1 | 5/2011 | Hoffmuller et al. | |
| 2011/0114733 | A1 | 5/2011 | Heim | |
| 2011/0157183 | A1 | 6/2011 | Kaule et al. | |
| 2012/0126525 | A1 | 5/2012 | Dorfler et al. | |
| 2012/0168515 | A1 | 7/2012 | Schutzmann et al. | |
| 2012/0170124 | A1 | 7/2012 | Fuhse et al. | |

FOREIGN PATENT DOCUMENTS

| | | | |
|---|---|---|---|
| DE | 102005006231 | | 8/2006 |
| DE | 102005006277 | | 8/2006 |
| DE | 102005025095 | | 12/2006 |
| EP | 0330738 | A1 | 9/1989 |
| EP | 1023499 | B1 | 5/2004 |
| EP | 1747905 | A2 | 1/2007 |
| WO | WO 91/06925 | A1 | 5/1991 |
| WO | WO 97/19820 | A1 | 6/1997 |
| WO | WO 97/31774 | A1 | 9/1997 |
| WO | WO 99/13157 | A1 | 3/1999 |
| WO | WO 03/097378 | A2 | 11/2003 |
| WO | WO 2004/098900 | A2 | 11/2004 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006040069 | | 4/2006 |
| WO | WO 2006056342 | | 6/2006 |
| WO | WO 2006072380 | | 7/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |
| WO | WO 2008/000350 | | 1/2008 |
| WO | WO 2008/000351 | | 1/2008 |
| WO | WO 2008/049533 | | 5/2008 |
| WO | WO 2008/061636 | | 5/2008 |
| WO | WO 2008/071325 | | 6/2008 |
| WO | WO 2009/000527 | | 12/2008 |
| WO | WO 2009/000528 | | 12/2008 |
| WO | WO 2009/000529 | | 12/2008 |
| WO | WO 2009/000530 | | 12/2008 |
| WO | WO 2009/012893 | | 1/2009 |
| WO | WO 2009/024265 | | 2/2009 |
| WO | WO 2009/080262 | | 7/2009 |
| WO | WO 2009/080263 | | 7/2009 |
| WO | WO 2009/083146 | | 7/2009 |
| WO | WO 2009/083151 | | 7/2009 |
| WO | WO 2009/100831 | | 8/2009 |
| WO | WO 2009/100869 | | 8/2009 |
| WO | WO 2009/109291 | | 9/2009 |
| WO | WO 2009/121578 | | 10/2009 |
| WO | WO 2009/149831 | | 12/2009 |
| WO | WO 2009/149833 | | 12/2009 |
| WO | WO 2009/156079 | | 12/2009 |
| WO | WO 2010/000470 | | 1/2010 |
| WO | WO 2010/003646 | | 1/2010 |
| WO | WO 2010/028739 | | 3/2010 |
| WO | WO 2011/012281 | | 2/2011 |
| WO | WO 2011/032665 | | 3/2011 |
| WO | WO 2011/032671 | | 3/2011 |

OTHER PUBLICATIONS

International Preliminary Report on Patentability, International Application No. PCT/EP2009/000882, 8 pages, Sep. 7, 2010, English Translation.

* cited by examiner

SECURITY ELEMENT AND METHOD FOR PRODUCING THE SAME

CROSS-REFERENCE TO RELATED APPLICATIONS

This application is the U.S. National Stage of International Application No. PCT/EP2009/000882, filed Feb. 9, 2009, which claims the benefit of German Patent Application DE 10 2008 008 685.1, filed Feb. 12, 2008, both of which are hereby incorporated by reference to the extent not inconsistent with the disclosure herewith.

The present invention relates to a security element having a metalized microrelief pattern and a negative pattern, as well as a method for manufacturing the same.

For protection, data carriers, such as value or identification documents, but also other valuable articles, such as branded articles, are often provided with security elements that permit the authenticity of the data carrier to be verified, and that simultaneously serve as protection against unauthorized reproduction. The security elements can be developed, for example, in the form of a security thread embedded in a banknote, a cover foil for a banknote having a hole, an applied security strip or a self-supporting transfer element that, after its manufacture, is applied to a value document.

To increase the security, and as counterfeit protection, the security elements are often provided with negative patterns, such as a so-called negative lettering. These negative patterns are especially formed by metal-free regions in an otherwise continuous metalization of the security element.

To manufacture such metal-free regions, in publication WO 99/13157, a washing process is described in which a translucent substrate foil is printed on with a desired pattern using a printing ink having a high pigment content. Due to the high pigment content, after drying, the printing ink forms a porous, raised inking. On the printed-on substrate foil is then formed a thin cover layer that, in the region of the inking, only partially covers the color body due to its large surface and the porous structure. The inking and the overlying cover layer can then be removed by washing out with a suitable solvent, such that gaps are produced in the cover layer in the originally printed-on regions of the substrate foil. Through the achievable sharp contours, by imprinting lettering, an easily readable negative lettering, for example, can be introduced into the cover layer.

Also metalized holograms, holographic grating images and other hologram-like diffraction patterns can be provided with a negative pattern with such a washing process or through imprinting a resist mask on the hologram metalization and a subsequent etching step. With conventional methods, however, it is not possible to develop the relief patterns of the hologram in exact register with the hologram metalization and the metal-free regions of the negative pattern. Since separate work steps are required for the imprint of a washable ink or a resist coating that determines the position of the later negative pattern and for the embossing of the hologram, an exact positioning of the embossing and the negative pattern cannot be guaranteed.

Based on that, the object of the present invention is to avoid the disadvantages of the background art and especially to specify a method for manufacturing a security element having a metalized microrelief pattern and a negative pattern in register therewith, as well as a security element that is manufactured accordingly.

This object is solved by the method having the features of the main claim. An associated security element and a data carrier having such a security element are specified in the coordinated claims. Developments of the present invention are the subject of the dependent claims.

According to the present invention, in a method for manufacturing a security element having a metalized microrelief pattern and a negative pattern in register therewith, P) a substrate is provided with an embossing pattern having elevations and depressions that form first and second regions having different first and second height levels,
   wherein the desired microrelief pattern is introduced into the first regions of the embossing pattern, and
   the second regions of the embossing pattern are developed in the form of the desired negative pattern, M) the embossing pattern with the first and second regions is contiguously metalized, and L) the metalized embossing pattern is impinged on with laser radiation to selectively remove the metalization in the second regions of the embossing pattern through the action of the laser radiation.

The microrelief pattern of the security element can especially constitute a diffractive pattern, such as a hologram, a holographic grating image or a hologram-like diffraction pattern, or also an achromatic pattern, such as a matte pattern having a non-colored, typically silvery matte appearance, a blaze lattice having a sawtooth-like groove profile, or a Fresnel lens arrangement. The dimensions of the pattern elements of the diffractive microrelief patterns are usually on the order of the wavelength of light, in other words normally between 300 nm and 1 μm. Some microrelief patterns exhibit also smaller pattern elements, such as subwavelength gratings or moth-eye patterns whose pattern elements can also be smaller than 100 nm.

In an advantageous variant of the present invention, in step P), the microrelief pattern is introduced into first, depressed regions having a low height level, and the negative pattern is formed by second, raised regions having a high height level.

Here, to the metalized embossing pattern is preferably applied, after the metalization step M), a laser-beam-absorbing cover layer that fills the depressions of the embossing pattern. After its application, the laser-beam-absorbing cover layer is expediently removed from the raised regions of the metalized embossing pattern, especially squeegeed or wiped off. Here, a technically unavoidable, thin toning film of the laser-beam-absorbing cover layer can remain on the raised regions of the metalized embossing pattern. As explained in greater detail below, such a toning film can surprisingly even support and promote the desired demetalization of the raised regions.

With respect to the toning film that remains on the raised regions, it should be noted that, given a suitable choice of the substrate (embossing lacquer) to be coated, said film remains on the raised regions also, if applicable, without prior squeegeeing. In practice, namely, it has been shown that, with suitable, embossed coating substrates, the cover layer material collects largely in the depressions and a thin toning film remains on the raised regions.

The laser-beam-absorbing cover layer advantageously includes laser-beam-absorbing pigments or dyes. For this, for laser radiation in the near infrared, for example carbon black pigments, antimony-/tin-based infrared absorbers, or also magnetic pigments, such as on the basis of iron-oxides, may be used, the latter being additionally suitable, besides for the absorption effect that is important for manufacture, as feature substances for machine-checking the authenticity of the finished security element. Depending on the type of pigment, the concentration of the pigments is between about 1% and about 65%, typically in the range of about 15%.

In other embodiments, the laser-beam-absorbing cover layer can also consist of a material that is decomposed by the action of the laser radiation and, in the process, consumes the irradiated laser energy. For this, cover layers on the basis of poly(methyl methacrylates), for example, may be used that can be thermally depolymerized. A concrete cover layer material can consist, for example, of a mixture of 25% Degalan M345 (Degussa), 74% ethyl acetate and 1% of an infrared absorber, such as carbon black.

The laser-beam-absorbing cover layer advantageously includes a binder of high temperature resistance. In particular, a high-temperature-resistant UV lacquer that is provided with an absorber can be applied as the laser-beam-absorbing cover layer. UV lacquers of high temperature resistance often contain novolac-modified epoxy acrylate resins, such as the lacquer raw materials Ebecryl 639 and Ebecryl 629 offered by Cytec, or the lacquer raw material Craynor CN112C60 offered by CrayValley. However, high-temperature-resistant lacquers that do not require this component are also known, especially from the electronics field. It is understood that, to formulate a high-temperature-resistant, radiation-curing lacquer (UV or electron-beam curing), in addition to the lacquer raw materials mentioned and others, still further substances, such as photoinitiators and reaction diluting agents, can or must be used to adjust the viscosity. Further, to adjust its absorption characteristics, the high-temperature-resistant lacquer can include suitable dyes and/or pigments as absorbers.

Further, it is advantageous when the laser-beam-absorbing cover layer exhibits a high thermal conductivity and/or a high thermal capacity, since the heat created can then be quickly dissipated from the sites impinged on, or in the case of a moderate temperature increase, a large amount of heat can be absorbed.

The laser-beam-absorbing cover layer can be removed, for example washed out, after the demetalization step or it can remain in the security element and advantageously be integrated in the design of the security element. In the latter case, the cover layer can especially also include a feature substance for visually and/or machine-checking the authenticity of the security element.

In this variant of the present invention, the impingement of the metalized embossing pattern with laser radiation in step L) expediently occurs from the metalized front of the embossing pattern.

According to a further, likewise advantageous variant of the present invention, in step P), the microrelief pattern is introduced into second, raised regions having a high height level, and the negative pattern is formed by first, depressed regions having a low height level. In this variant of the present invention, the impingement of the metalized embossing pattern with laser radiation in step L) expediently occurs from the reverse of the embossing pattern, facing away from the metalization.

To achieve an interaction between the laser radiation and the embossing pattern, here, the embossing pattern can be developed having a laser-beam-absorbing embossing lacquer. Advantageously, laser-beam-absorbing additives are added to the embossing lacquer before the application to the substrate. Such additives advantageously exhibit a feature substance for visually and/or machine-checking the authenticity of the security element.

In all variants of the present invention, for demetalization, the embossing pattern can be impinged on with an infrared laser in the wavelength range from 0.8 μm to 3 μm, especially with a Nd:YAG laser. The energy density required for demetalization depends on the metal used, the layer thickness applied and the absorption of the cover layer or of the embossing lacquer. The laser intensity is preferably as uniform as possible across the irradiated region, which can be achieved, for example, through beam shaping of the laser beam profile, especially through a so-called top-hat profile having a substantially rectangular laser beam profile.

In some variants of the present invention, the coated substrate includes regions in which control marks for the control system are present. These control marks can also be arranged outside the actual embossed motifs. They can advantageously be demetalized separately with a washing process in which, before the metalization step M), a soluble washable ink is imprinted in the cited regions in the form of the desired gaps, and after the metalization step M), the washable ink is washed off in the region of the gaps together with the metalization that is present there, by a solvent. Further details on such a washing process can be found in publication WO 99/13157, whose disclosure is incorporated in the present application by reference. A separate demetalization with such a washing process is also appropriate to cleanly and reliably demetalize the region of the weld seam of the tools used to emboss the embossing pattern.

The present invention also comprises a security element for security papers, value documents and the like, having a metalized microrelief pattern and, in register therewith, a negative pattern that is manufacturable in the described manner and that exhibits an embossing pattern having elevations and depressions that form first and second regions having different first and second height levels, the metalized microrelief pattern being present in the first regions of the embossing pattern and the negative pattern being present in the second regions of the embossing pattern.

The security element itself is especially a security thread, a security band, a security strip, a patch or a label for application to a security paper, value document or the like. The present invention further comprises a data carrier, especially a branded article, a value document or the like, having a security element of the kind described.

Further exemplary embodiments and advantages of the present invention are described below with reference to the drawings. To improve clarity, a depiction to scale and proportion is dispensed with in the drawings.

Figure 2:
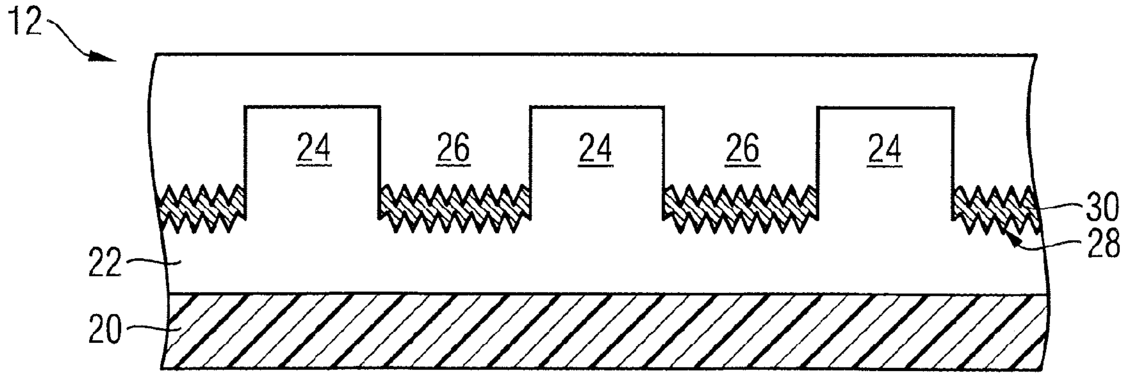
Figure 3A:
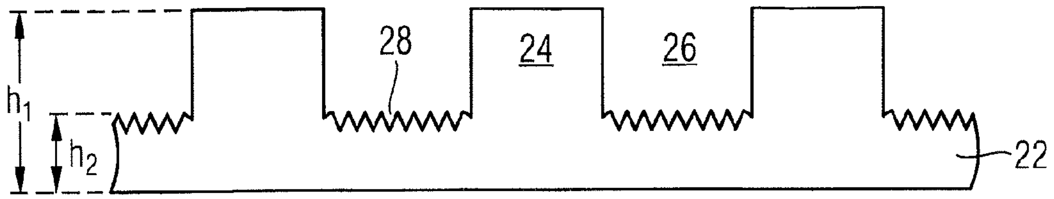
Figure 3B:
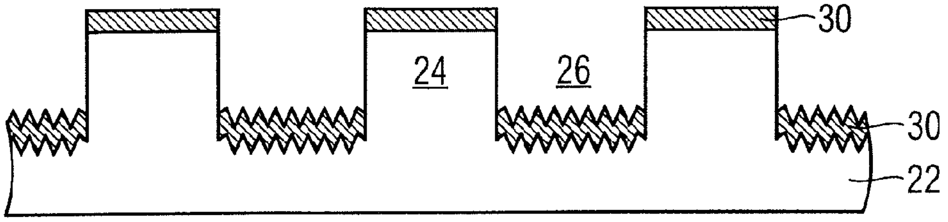
Figure 3C:
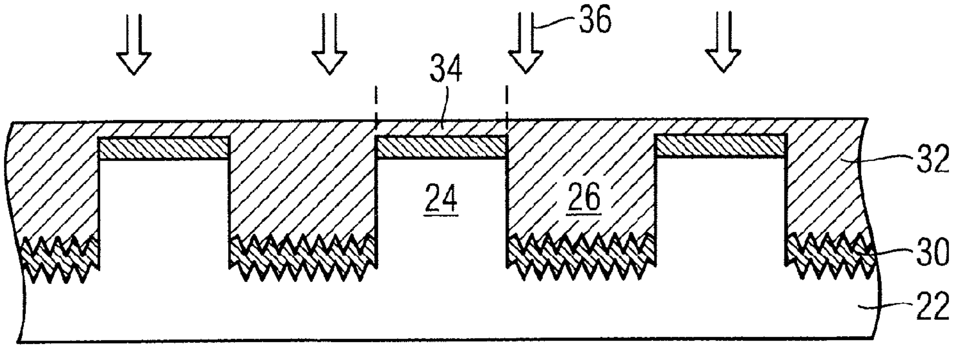
Figure 3D:
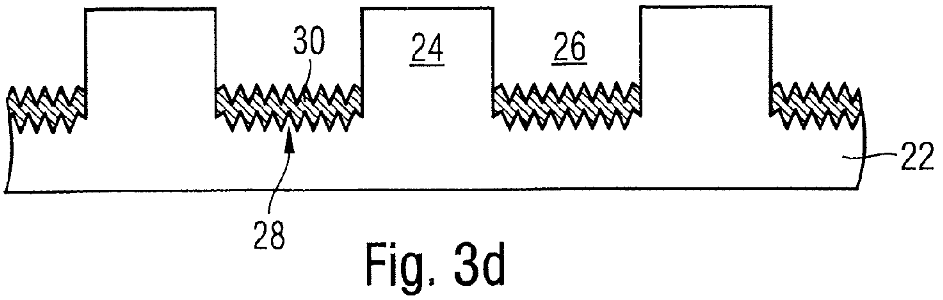
Figure 4A:
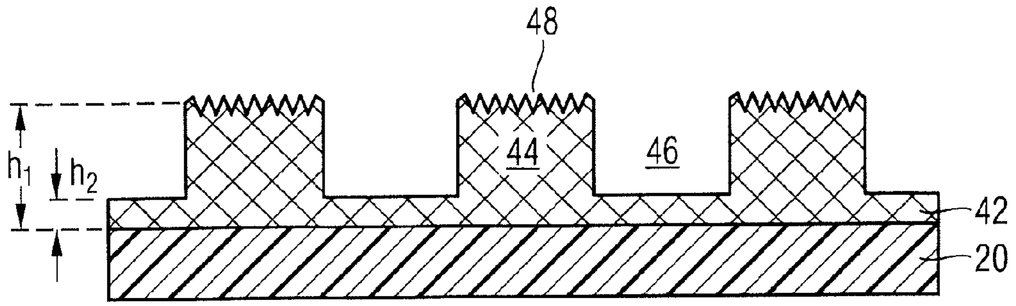
Figure 4B:
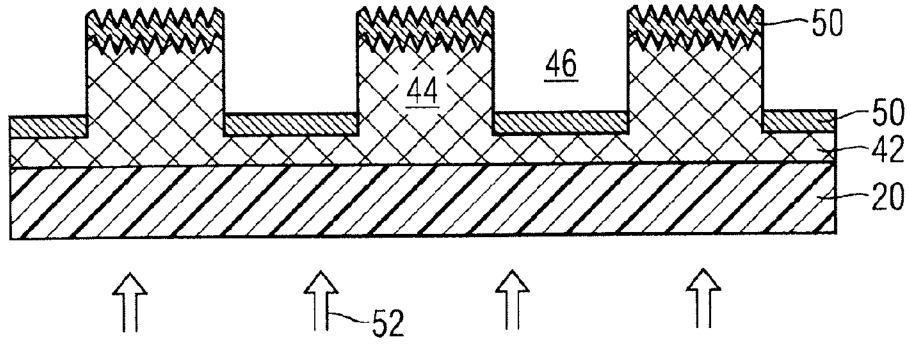
Figure 4C:
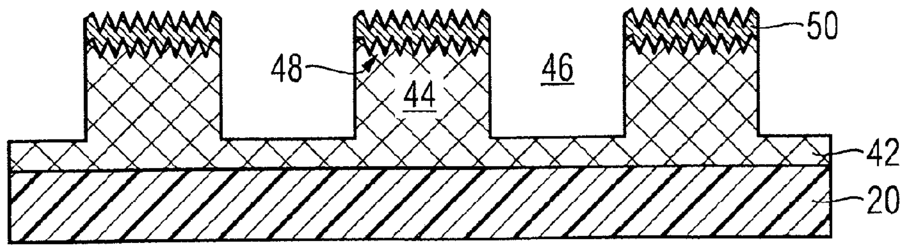

Shown are:

FIG. 1 a schematic diagram of a banknote having a hologram security thread according to an exemplary embodiment of the present invention, FIG. 2 schematically, a cross section through the security thread in FIG. 1, FIG. 3 in (a) to (d), intermediate steps in the manufacture of the security thread in FIGS. 1 and 2, and FIG. 4 in (a) to (c), intermediate steps in the manufacture of a security element according to a further exemplary embodiment of the present invention.

The invention will now be explained using the example of security elements for banknotes. For this, FIG. 1 shows a schematic diagram of a banknote 10 provided with a hologram security thread 12 according to the present invention. The hologram security thread 12 exhibits a metalized hologram region 14 that is provided with a negative lettering 16, which in the exemplary embodiment forms the numeric string "20". According to the present invention, the negative piece of information 16 is exactly registered with the embossed relief patterns of the hologram 14 and with the hologram metalization.

It is understood that the present invention is not limited to hologram security elements and banknotes, but can be used in all types of security elements, for example in labels for goods and packaging or in securing documents, identity cards, passports, credit cards, health cards and the like. In banknotes and similar documents, besides security threads, also transfer elements, for example, may be used.

With reference to the schematic cross section shown in FIG. 2, the security thread 12 exhibits a substrate foil 20 that is provided on its top with a UV-curing embossing lacquer layer 22. The embossing lacquer layer 22 includes an embossing pattern having elevations 24 and depressions 26, the depressions 26 additionally exhibiting a microrelief pattern 28 in the form of the hologram 14 to be depicted and a hologram metalization 30, for example composed of aluminum. The elevations 24, in contrast, are provided neither with a microrelief embossing nor with a metalization and thus form, within the hologram region 14, a negative pattern 16 that is exactly registered with both the microrelief embossing 28 and the hologram metalization 30.

In FIG. 2 and the exemplary embodiments described below, to improve diagram clarity, the elevations and depressions of the embossing pattern are always depicted as rectangle patterns having only two height levels. It is understood, however, that the elevations and depressions can generally also be provided with oblique sides, with rounded transitions and/or with additional patterns. Also, always only the embossing pattern and the layers are shown that are required for the explanation, and other elements of the structure, such as substrate foils, adhesive and protective layers, are either shown only schematically or are omitted entirely.

The manufacture of an exactly registered security element according to the present invention, such as the hologram security thread 12, will now be explained with reference to FIG. 3, with the substrate foil 20 not being shown in each case for the sake of simpler illustration. With respect, first, to FIG. 3(*a*), an embossing pattern having elevations 24 and depressions 26 is embossed in the embossing lacquer layer 22, such that first regions 24 having a high height level $h_1$ and second regions 26 having a low height level $h_2$ are created.

Here, the depressed, second regions 26 of the embossing patterns are additionally provided with a microrelief pattern 28 in the form of the hologram 14 to be depicted, while the raised first regions 24 are developed in the form of the desired negative pattern 16.

Then the embossing pattern 24, 26, 28 is coated contiguously with a metalization 30, as shown in FIG. 3(*b*). For the metalization, for example aluminum, chrome, copper or silver can be used.

Instead of a simple metal layer, of course also a multi-layer structure that includes a metal layer, such as a color-shifting thin-film element, can be used. Such a thin-film element typically exhibits a metallic reflection layer, for example composed of aluminum, a dielectric spacing layer, for example composed of $SiO_2$, and a thin absorber layer, for example composed of chrome. Here, particularly advantageously, thin-film elements can be used that can be easily demetalized due to an absorption maximum lying in the range of the laser wavelength of the demetalization laser used. Such thin-film elements are described in detail in WO 97/31774, whose disclosure is incorporated in the present application by reference.

Thereafter, the metalized embossing pattern is contiguously coated with a laser-beam-absorbing lacquer that fills the depressions 26 of the embossing pattern. The applied lacquer is squeegeed, rolled or wiped off from the surface of the embossing pattern, with a technically unavoidable, thin toning film 34 normally remaining on the elevations 24 of the embossing pattern. Overall, after this method step, a metalized embossing pattern having a lacquer application 32 results that completely fills out the depressions 26 of the embossing pattern and that is present in a thin toning film 34 on the elevations 24, as shown in FIG. 3(*c*).

To selectively demetalize the elevations 24, the metalized and lacquer-coated embossing pattern is impinged on with laser radiation 36 across its entire surface. Here, the laser-beam-absorbing lacquer and the laser parameters, especially wavelength, beam shape and intensity, are coordinated with one another in such a way that an interaction between the laser radiation and the lacquer results that is sufficient for the demetalization. This interaction consists especially in the absorption of the laser radiation by pigments or dyes that are present in the lacquer. In some embodiments, the focus is not on the direct interaction of the lacquer with the laser radiation, but rather on the properties of the lacquer with respect to the effects of the laser radiation after its absorption, for example the ability of the lacquer to absorb a large amount of heat and/or the ability to quickly dissipate the resulting heat from the irradiated regions.

For the laser irradiation, especially an infrared laser, for example a Nd:YAG laser of a wavelength of 1064 nm, can be used. The laser intensity is ideally uniform across the irradiated region, for example in the form of a substantially cylindrical, so-called top-hat, profile. The energy density that can be achieved depends on the material and the thickness of the metalization 30 and the absorption of the lacquer layer 32, and for the demetalization of a 40 nm thick aluminum layer 30, can be, for example, 1.5 $kJ/m^2$.

Coordinated with the irradiation with such a Nd:YAG laser, in the exemplary embodiment in FIG. 3, as the laser-beam-absorbing lacquer 32, a UV lacquer of high temperature resistance is used, into which an infrared absorber having an absorption maximum in the near infrared is dispersed. Through the action of the laser radiation 36 on the lacquer-coated metalization 30, the raised regions 24 are demetalized, while the metalization in the depressed regions 26 is preserved. Thus, after removing, for example washing out, the absorbing lacquer 32, a partially metalized embossing pattern is obtained in which the metalized microrelief patterns 28, 30 of the depressions 26 are perfectly registered with the negative patterns of the elevations 24, as depicted in FIG. 3(*d*).

Surprisingly, it was found here that a thin toning film that remains in the region of the elevations 24 can even promote the demetalization by the laser impingement. Without wanting to be bound to a specific explanation, the mechanism of selective demetalization and the surprising improvement through a thin toning film is presently explained as follows: In the region of the depressions 26 in which the lacquer 32 is present having a large layer thickness, the incident laser radiation is largely or even completely absorbed in the lacquer 32, transformed into heat and distributed through the binder content of the lacquer in the volume of the depression 26. Also the heat that is potentially created in the metalization 30 of the microrelief pattern 28 upon absorption of the laser radiation is, by means of the lacquer 32, dissipated from the metal layer and distributed innocuously. The laser radiation and the heat produced thus do not reach the metalized microrelief patterns 28, 30, or do so only strongly attenuated, such that no sufficient energy input for a demetalization occurs there.

If the region of the elevations 24 is first viewed without a thin toning film, then the laser radiation is absorbed there by the metalization without attenuation and leads, with suitably chosen laser parameters, to evaporation, oxidation or another removal of the metalization 30 of the elevations 24. Due to the higher absorption of the infrared absorber of the lacquer 32 compared with the bare metal 30, a thin toning film 34 can even also lead to an increased energy input and, in this way, promote the demetalization of the elevations 24.

UV lacquers of high temperature resistance can contain, for example, novolac-modified epoxy resin acrylates, even if this component need not necessarily be present in modern lacquer developments. In addition to a high temperature resistance, the lacquer 32 preferably also exhibits a high thermal conductivity and/or a high thermal capacity in order to be able to dissipate and absorb the heat created at the metalization of the microrelief pattern 28. According to the present understanding, in the raised regions 24, where the lacquer is present only as a thin toning film, the effect of the heat dissipation and heat absorption is low and, furthermore, due to the increased absorption, is also exceeded by the additional energy input, such that overall, an increased amount of energy is available there for the demetalization.

In principle, the above-described advantageous effect of the thin toning film can also be achieved through application of a thin metal layer, especially a thin chrome layer. For example, an approximately 10 nm thick chrome layer is very easy to demetalize, through which are simultaneously detached overlying layers that, taken alone, are difficult to demetalize. Suitable methods for applying an above-described thin metal layer are known to the person of skill in the art, which is why this will not be further addressed here. The embodiment described above achieves, through the use of thin metal layers in the regions to be demetalized, a similar effect as a thin toning film that remains there. Presently, however, the embodiments having thin metal layers that facilitate demetalization, especially chrome layers, are not preferred.

Various pigments or dyes that, per se, are known to the person of skill in the art can be used as the infrared absorber. The proportion of pigments in the absorbing lacquer is generally between 1% and 65%, typically about 10% to 20%.

The absorbing lacquer layer can be removed after the demetalization, as shown, for example, in the exemplary embodiment in FIG. 3. However, it is also possible to leave the lacquer layer in the layer structure after the demetalization and, if applicable, to integrate it into the appearance of the security element. This is appropriate, for example, when the security element is designed for viewing from the reverse, in other words the side of the substrate foil. In particular, with a view to its solubility, the binder of the lacquer layer is also selected according to whether a later removal of the lacquer layer is intended or not.

In another variant of the present invention, the laser-beam-absorbing lacquer layer 32 can also be chosen such that it is decomposed by the absorbed laser radiation and, in the process, largely consumes the irradiated laser energy in regions of a large layer thickness such that the demetalization threshold for the covered metal layer 30 is no longer exceeded there. For example, in this variant, the lacquer 32 can be made up of poly(methyl methacrylates) that can be thermally depolymerized. Upon laser impingement, the depolymerization and the evaporation of the lacquer layer proceed endothermically and, in the process, consume the irradiated laser energy. In the regions of large layer thickness, such as the depressions 26, such a lacquer layer thus protects the underlying metalization 30, while in the raised regions 24, which exhibit no lacquer layer 34 or only a thin one, a demetalization occurs.

In a further alternative method variant, the application of a separate, absorbing cover layer can be omitted and the embossing lacquer itself used as an exposure mask for the laser demetalization, as explained with reference to the diagram in FIG. 4.

In this variant, the laser wavelength of the demetalization laser and the embossing lacquer used to produce the embossing pattern are coordinated with one another in such a way that an interaction is created between the embossing lacquer and the laser radiation in the sense cited above. In particular, for the demetalization, a laser wavelength can be chosen at which the embossing lacquer used absorbs, or the embossing lacquer can have systematically added to it an absorber for a desired laser wavelength. Further, an embossing lacquer of high temperature resistance can be chosen that can easily absorb and quickly dissipate the heat created in the embossing lacquer or at the metalization.

In all cases, the embossing lacquer 42, as shown in FIG. 4(*a*), is applied to a substrate foil 20 and embossed in the form of an embossing pattern having elevations 44 and depressions 46, such that first regions 44 having a high height level $h_1$ and second regions 46 having a low height level $h_2$ are created. Unlike in the exemplary embodiment in FIGS. 2 and 3, in this variant of the present invention, the raised, first regions 44 of the embossing pattern are provided with a microrelief pattern 48 in the form of the hologram 14 to be depicted, while the depressed, second regions 46 are developed in the form of the desired negative pattern 16.

With reference to FIG. 4(*b*), thereafter, the embossing pattern 44, 46, 48 is contiguously coated with a metalization 50, and the metalized embossing pattern is impinged on from the reverse across its entire surface with laser radiation 52. It is understood that, for this, the substrate foil 20 must be transparent for the laser wavelength, or that, before the demetalization, the layer sequence is transferred to another material and the substrate foil 20 is removed.

In this method variant, the embossing lacquer 42 itself acts as an exposure mask: In the region of the elevations 44, the embossing lacquer lies in a large layer thickness between the incident laser radiation 52 and the metalization 50, such that the laser radiation there, similar to the above-described case of a lacquer layer present in the depressions 26, is largely or even completely absorbed in the embossing lacquer layer 42 and the heat created is distributed in the volume of the elevation 44. In this way, a demetalization of the metal layer 50 present on the elevations 44 is effectively suppressed. In the depressed regions 46, in contrast, the incident laser energy reaches the metal layer 50 present there substantially unattenuated or even intensified by the absorption of the embossing lacquer and leads to its demetalization. Here, it should be noted that the embossing 46 extends so deeply, that is, the height level $h_2$ is chosen to be sufficiently small, that the absorbed laser energy exceeds the demetalization threshold in the depressions 46.

Thus, overall, also in this variant, a metalized hologram 44, 50 having a perfectly registered negative piece of information 46 is produced, with the role of the raised and depressed regions being precisely reversed compared with the embodiment in FIGS. 2 and 3.

The laser absorbing lacquer used in the embodiment in FIGS. 2 and 3 can also be furnished with additional features and include, for example, magnetic, electrically conductive, thermochromic, phosphorescent, fluorescent or other luminescent feature substances. The additional feature can also lie in only a desired coloring of the lacquer. Feature substances can both have a function in the demetalization, for example as absorbers, and later act in the finished security element as an authenticity feature.

In some embodiments, the mask can be washed out with suitable solvents or also aqueously, which opens up further combination possibilities. For example, in a first step, demetalized regions can be produced whose shape and position are specified in the manner explained above by the elevations and depressions of the embossing pattern. To demetalize further regions, it is possible, for example, to demetalize from the opposite side through laser irradiation, or the soluble lacquer can be removed, a resist mask printed and then demetalized anew. A combination of the methods described above with further demetalization methods can bring advantages especially outside of the actual motifs, for example to reliably demetalize the regions at the weld seam of embossing tools or regions of control marks, which can also lie outside of the embossing region of the motifs. It is understood that the method according to the present invention can be combined with all known methods for demetalization, especially with a demetalization through etching. For such an etching demetalization, normally a resist coating in the form of a desired motif is produced on the metalization, and those regions of the metalization that are not covered by the resist coating are removed by a suitable etchant. Further details on demetalization by means of etching are known to the person of skill in the art.

Here, control marks that lie at the edge can already be coated with a washable ink following the embossing, before the lacquer coating of the main surface of the embossing pattern, and after the metalization, washed free to, in this way, immediately expose the elements that are important for the control system. Further details on a washing process that is usable here can be found in publication WO 99/13157, whose disclosure is incorporated in the present application by reference.

Also in the region of the weld seam of embossing tools, a separate demetalization by a washing process can be advantageous since, there, the topography is often determined by undesired deposits and then, upon coating with laser absorbing lacquer, a poorly defined layer thickness is produced.

The invention claimed is:

1. A method for manufacturing a security element having a metalized microrelief pattern and a negative pattern in register therewith, in which P) a substrate is provided with an embossing pattern having elevations and depressions that form first and second regions having different first and second height levels, wherein the desired microrelief pattern is introduced into the first regions of the embossing pattern, and the second regions of the embossing pattern are developed in the form of the desired negative pattern, M) the embossing pattern with the first and second regions is contiguously metalized, and L) the metalized embossing pattern is impinged on with laser radiation to selectively remove the metalization in the second regions of the embossing pattern through the action of the laser radiationcharacterized in that, after the metalization step M), to the metalized embossing pattern is applied a laser-beam-absorbing cover layer that fills the depressions of the embossing pattern characterized in that the laser-beam-absorbing cover layer is decomposed by the action of the laser radiation and, in the process, the irradiated laser energy is consumed.

2. The method according to claim 1, characterized in that the microrelief pattern in step P) is introduced into first, depressed regions having a low height level, and the negative pattern is formed by second, raised regions having a high height level.

3. The method according to claim 1, characterized in that, after its application, the laser-beam-absorbing cover layer is removed from the raised regions of the metalized embossing pattern.

4. The method according to claim 1, characterized in that a thin toning film of the laser-beam-absorbing cover layer remains on raised regions of the metalized embossing pattern.

5. The method according to claim 1, characterized in that the laser-beam-absorbing cover layer includes laser-beam-absorbing pigments or dyes.

6. The method according to claim 1, characterized in that the laser-beam-absorbing cover layer includes a binder of high temperature resistance.

7. The method according to claim 1 characterized in that a high-temperature-resistant UV lacquer provided with an absorber is applied as the laser-beam-absorbing cover layer.

8. The method according to claim 1, characterized in that a material having high thermal conductivity and/or high thermal capacity is chosen as the laser-beam-absorbing cover layer.

9. The method according to claim 1, characterized in that the laser-beam-absorbing cover layer remains in the security element after the demetalization step.

10. The method according to claim 9, characterized in that the laser-beam-absorbing cover layer includes a feature substance for visually and/or machine-checking the authenticity of the security element.

11. The method according to claim 1, characterized in that the impingement of the metalized embossing pattern with laser radiation in step L) occurs from the metalized front of the embossing pattern.

12. The method according to claim 1, characterized in that the microrelief pattern in step P) is introduced into second, raised regions having a high height level, and the negative pattern is formed by first, depressed regions having a low height level.

13. The method according to claim 12, characterized in that the impingement of the metalized embossing pattern with laser radiation in step L) occurs from the reverse of the embossing pattern, facing away from the metalization.

14. The method according to claim 12, characterized in that the embossing pattern is developed in a laser-beam-absorbing embossing lacquer.

15. The method according to claim 12, characterized in that laser-beam-absorbing additives are added to the embossing lacquer before the application to the substrate.

16. The method according to claim 15, characterized in that the laser-beam-absorbing additives include a feature substance for visually and/or machine-checking the authenticity of the security element.

17. The method according to claim 1, characterized in that, for demetalization, the embossing pattern is impinged on with an infrared laser in the wavelength range between 0.8μm and 3μm.

18. The method according to claim 1, characterized in that regions in which control marks for a control system are present on the substrate and/or regions of weld seams of embossing tools used for embossing are demetalized with a washing process in which, before the metalization step M), a soluble washable ink is imprinted in the form of desired gaps in the regions in which the control marks are present, or in the regions of weld seams, and after the metalization step M), the washable ink is washed off in the region of the gaps, together with a metalization that is present there, by a solvent.

19. The method according to claim 1, characterized in that, after its application, the laser-beam-absorbing cover layer is squeegeed or wiped off.

20. A method for manufacturing a security element having a metalized microrelief pattern and a negative pattern in register therewith, in which P) a substrate is provided with an embossing pattern having elevations and depressions that form first and second regions having different first and second height levels, wherein the desired microrelief pattern is introduced into the first regions of the embossing pattern, and the second regions of the embossing pattern are developed in the form of the desired negative pattern, M) the embossing pattern with the first and second regions is contiguously metalized, and L) the metalized embossing pattern is impinged on with laser radiation to selectively remove the metalization in the second regions of the embossing pattern through the action of the laser radiationcharacterized in that, after the metalization step M), to the metalized embossing pattern is applied a laser-beam-absorbing cover layer that fills the depressions of the embossing pattern, characterized in that the laser-beam-absorbing cover layer is removed after the demetalization step.

21. The method according to claim 20, characterized in that the microrelief pattern in step P) is introduced into first, depressed regions having a low height level, and the negative pattern is formed by second, raised regions having a high height level.

22. The method according to claim 20, characterized in that, after its application, the laser-beam-absorbing cover layer is removed from the raised regions of the metalized embossing pattern.

23. The method according to claim 20, characterized in that a thin toning film of the laser-beam-absorbing cover layer remains on raised regions of the metalized embossing pattern.

24. The method according to claim 20, characterized in that the laser-beam-absorbing cover layer includes laser-beam-absorbing pigments or dyes.

25. The method according to claim 20, characterized in that the laser-beam-absorbing cover layer includes a binder of high temperature resistance.

26. The method according to claim 20, characterized in that a high-temperature-resistant UV lacquer provided with an absorber is applied as the laser-beam-absorbing cover layer.

27. The method according to claim 20, characterized in that a material having high thermal conductivity and/or high thermal capacity is chosen as the laser-beam-absorbing cover layer.

28. The method according to claim 20, characterized in that the laser-beam-absorbing cover layer remains in the security element after the demetalization step.

29. The method according to claim 28, characterized in that the laser-beam-absorbing cover layer includes a feature substance for visually and/or machine-checking the authenticity of the security element.

30. The method according to claim 20, characterized in that the impingement of the metalized embossing pattern with laser radiation in step L) occurs from the metalized front of the embossing pattern.

31. The method according to claim 20, characterized in that, for demetalization, the embossing pattern is impinged on with an infrared laser in the wavelength range between 0.8 μm and 3 μm.

32. The method according to claim 20, characterized in that regions in which control marks for a control system are present on the substrate and/or regions of weld seams of embossing tools used for embossing are demetalized with a washing process in which, before the metalization step M), a soluble washable ink is imprinted in the form of desired gaps in the regions in which the control marks are present, or in the regions of weld seams, and after the metalization step M), the washable ink is washed off in the region of the gaps, together with a metalization that is present there, by a solvent.

* * * * *